United States Patent
Daoud et al.

(10) Patent No.: US 6,832,035 B1
(45) Date of Patent: Dec. 14, 2004

(54) OPTICAL FIBER CONNECTION SYSTEM

(75) Inventors: Bassel H. Daoud, Parsippany, NJ (US); Ivan Pawlenko, Holland, PA (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 10/448,542

(22) Filed: May 30, 2003

(51) Int. Cl.[7] .............................................. G02B 6/00
(52) U.S. Cl. ..................................................... 385/135
(58) Field of Search ................................ 385/134–136

(56) References Cited

U.S. PATENT DOCUMENTS

| | | | | |
|---|---|---|---|---|
| 5,363,467 A | * | 11/1994 | Keith | 385/135 |
| 5,734,775 A | * | 3/1998 | Vidacovich et al. | 385/134 |
| 6,167,183 A | * | 12/2000 | Swain | 385/135 |
| 6,631,237 B2 | * | 10/2003 | Knudsen et al. | 385/134 |

* cited by examiner

Primary Examiner—Javaid H. Nasri

(57) ABSTRACT

An optical connector assembly is described. In one example, a panel includes a plurality of apertures formed therein. A plurality of receptacles are respectively supported within the plurality of apertures. Each of the plurality of receptacles is adapted to communicate with an optical connector. In addition, each of the plurality of receptacles is disposed at an angle with respect to a plane of the panel, where the angle is less than 90 degrees. In another example, a housing includes opposing side walls. A panel is mounted within the housing. The panel includes a plurality of apertures for supporting optical connectors. A spool is mounted to one of the opposing side walls of the housing.

7 Claims, 4 Drawing Sheets

OPTICAL FIBER CONNECTION SYSTEM

BACKGROUND OF THE INVENTION

1. Field of the Invention

The present invention generally relates to optical fiber interconnection devices and, more particularly, an optical fiber connection system having angled optical connectors.

2. Description of the Related Art

Due to the sensitive nature of the core of an optical fiber, there is a need to protect an optical fiber from external sources of stress, such as bending, pressure and strain, which increase signal loss. For example, an optical fiber should not be bent sharply anywhere along its path. If an optical fiber is bent past a critical angle, portions of transmitted light pulses will not be reflected within the core of the optical fiber and will no longer traverse the optical fiber. These attenuated portions of light pulses result in signal loss and, thus, degradation of signal quality. Moreover, excess stress on an optical fiber may result in breakage of the fiber resulting in a total signal loss.

Presently, optical interconnection devices include optical connectors that are mounted perpendicularly within a panel. Such perpendicular mounting of optical connectors maximizes the total depth required to manipulate and disconnect an optical connector. In some cases, the total depth associated with a perpendicularly mounted optical connector may be such that a technician may bend an optical fiber while attempting to manipulate the optical connector. Such inadvertent bending increases the risk that an optical fiber will be bent past the critical angle, resulting in signal loss and degradation of signal quality.

Furthermore, present optical interconnection devices store optical fiber slack on a spool mounted to the bottom of the interconnection device. From the bottom-mounted spool, the optical fibers are routed upward towards each optical fiber connector within the device. In some cases, a technician may deleteriously affect an upward routed optical fiber while attempting to manipulate an optical connector. As such, bottom-mounted spools for storing optical fiber slack within an optical interconnection device increase the risk that an optical fiber will be bent past the critical angle, resulting in signal loss and degradation of signal quality.

SUMMARY OF THE INVENTION

These and other deficiencies of the prior art are addressed by the present invention of an optical connector assembly. In one embodiment, an optical connector assembly includes a panel having a plurality of apertures formed therein. A plurality of receptacles are respectively supported within the plurality of apertures. Each of the plurality of receptacles is adapted to communicate with an optical connector. In addition, each of the plurality of receptacles is disposed at an angle with respect to a plane of the panel, where the angle is less than 90 degrees.

In another embodiment, an optical interconnection device includes a housing having opposing side walls. A panel is mounted within the housing. The panel includes a plurality of apertures for supporting optical connectors. For example, the optical connectors may be disposed at an angle with respect to a plane of the panel, where the angle is less than 90 degrees. A spool is also mounted to one of the opposing side walls of the housing.

BRIEF DESCRIPTION OF THE DRAWINGS

So that the manner in which the above recited features of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

Figure 1:
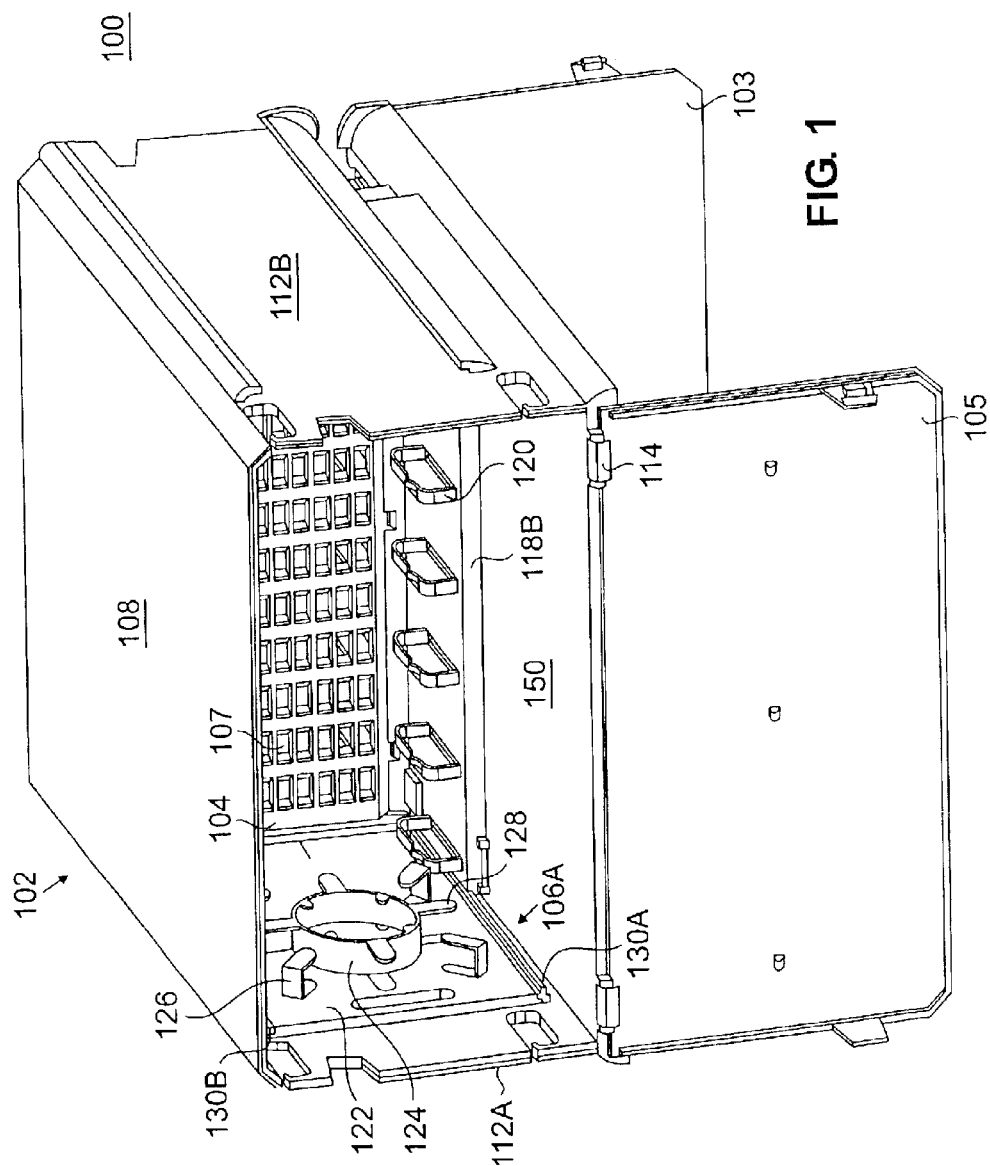
FIG. 1 is an isometric view of an optical interconnection device.

FIG. 1 is an isometric view of an optical interconnection device 100.

Figure 2:
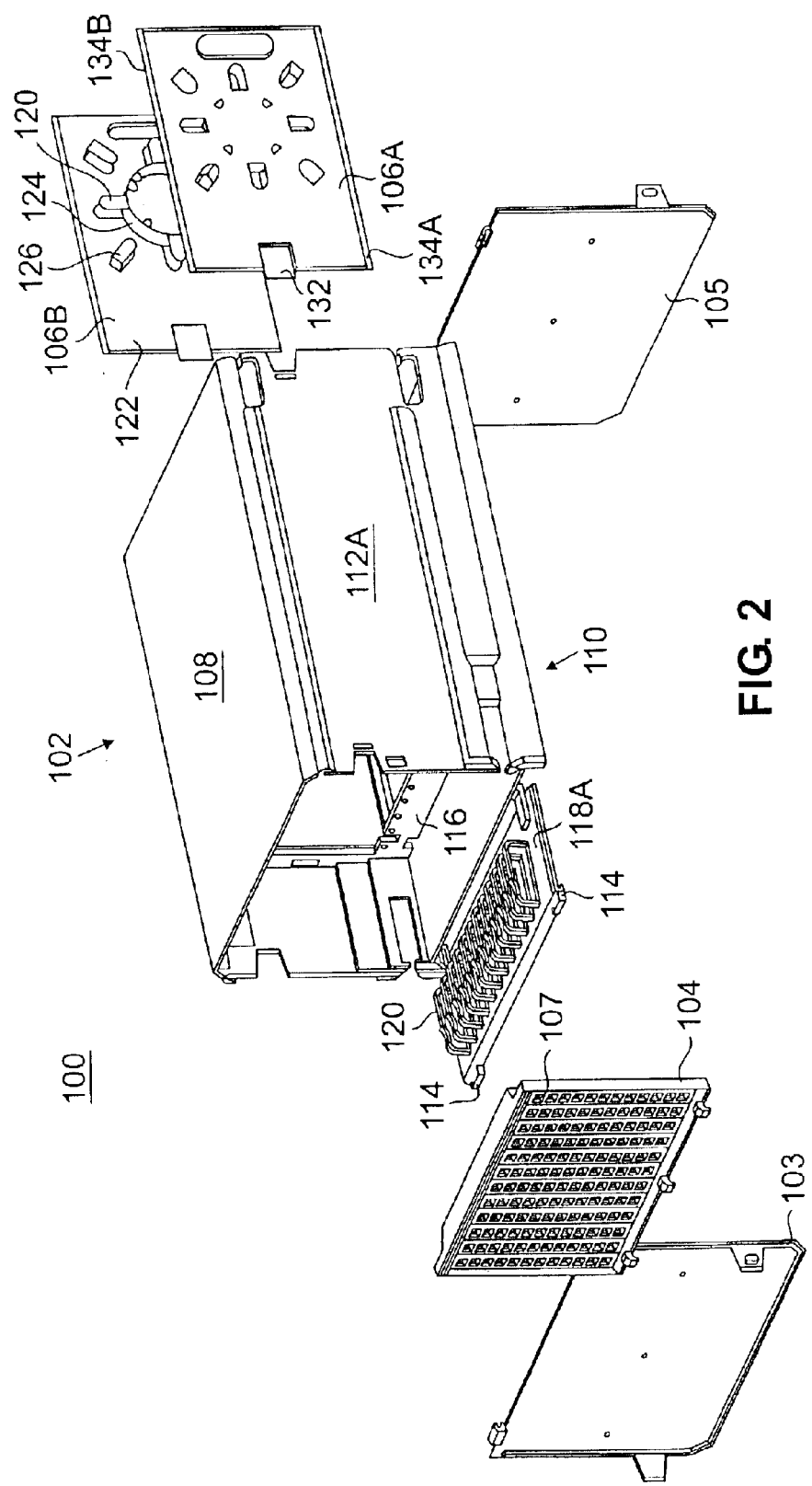
FIG. 2 is an isometric and exploded view of the optical interconnection device of FIG. 1.

FIG. 2 is an isometric and exploded view of the optical interconnection device 100 of FIG. 1. With reference to FIGS. 1 and 2, the optical interconnection device 100 comprises a housing 102, a front cover 103, a rear cover 105, a connector panel 104, opposing spools 106A and 106B (collectively referred to as spools 106), and optical fiber troughs 118A and 118B (collectively referred to as optical fiber troughs 118). The housing 102 may be constructed from sheet metal, plastic, and the like, and comprises a top panel 108, a bottom panel 110, and lateral opposing side panels 112A and 112B (collective referred to as side panels 112). The front cover 103 and the rear cover 105 are generally removable and are capable of pivoting on hinges 114 to allow access to the connector panel 104.

The connector panel 104 is mounted to a flange 116 within the housing 102. The connector panel 104 includes a plurality of apertures 107 for supporting optical connectors (shown in FIG. 3). For example, the plurality of apertures 107 may be configured to support a rectangular array of optical connectors. Although the connector panel 104 is shown as a single piece, those skilled in the art will appreciate that other types of known optical connector panel arrangements may be used, such as a plurality of individual optical connector panels each having a single column of apertures for supporting optical connectors.

The optical fiber troughs 118 are mounted to the bottom panel 110 of the housing 102 on each side of the connector panel 104. In particular, optical fiber trough 118A is mounted proximate the front of the housing 102, and optical fiber trough 118B is mounted proximate the rear of the housing 102. The optical fiber troughs 118 each include a plurality of retainer rings 120 for retaining optical fibers therein.

The spools 106A and 106B are respectively mounted to side panels 112A and 112B. Each of the spools 106 includes a panel portion 122, a cylindrical portion 124, and a plurality of retainer members 126. The cylindrical portion 124 extends outward from the panel portion 122, substantially perpendicular to the plane of the panel portion 122. The retainer members 126 are disposed around the cylindrical portion 124. The cylindrical portion 124 includes a radius of curvature greater than a predefined minimum bend radius of an optical fiber. The cylindrical portion 124 further includes a plurality of retention tabs 128 extending outward therefrom, substantially parallel to the plane of the panel portion 122. The panel portion 122 includes opposing edges 134A and 134B that are adapted to communicate with opposing grooves 130A and 130B, respectively, on the side panels 112. Notably, each of the spools 106 is supported in a respective one of the side panels 112 within respective grooves 130. The panel portion 122 further includes a latch member 132 for securing the panel portion 122 to a respective one of the side panels 112.

In this manner, the invention provides an optical fiber management system in which optical fibers that extend from optical connectors mounted within the connector panel 104 pass downward into the optical fiber trough 118B. The optical fibers may then be routed to the spools 106 on the side panels 112. Alternatively, the optical fibers may be directly routed to the spools 106 without passing through an optical fiber trough. In either case, the spools 106 may be used to store optical fiber slack within the optical interconnection device 100. Notably, since the spools 106 are mounted on the side panels 112 of the housing 102, rather than the bottom panel 110, a larger workspace 150 is provided within the housing 102.

In addition, the workspace 150 may be used to support an optical fiber management tray, which can hold optical fiber splices, optical fan-out devices, and the like. Exemplary optical fiber management trays are described in copending U.S. patent application serial No. 10/448,792, filed May 30, 2003, and co-pending U.S. patent application serial No. 10/448,511, filed May 30, 2003, each of which are incorporated by reference herein in their entireties. From the spools 106, the optical fibers may be routed either external to the housing 102 or to an optical fiber management tray mounted within workspace 150. As such, the optical fibers do not extend upward from the workspace 150 towards the connector panel 104, but rather towards the spools 106 on the side panels 112. This reduces the risk that a technician working within the housing 102 will damage the optical fibers.

Figure 3:
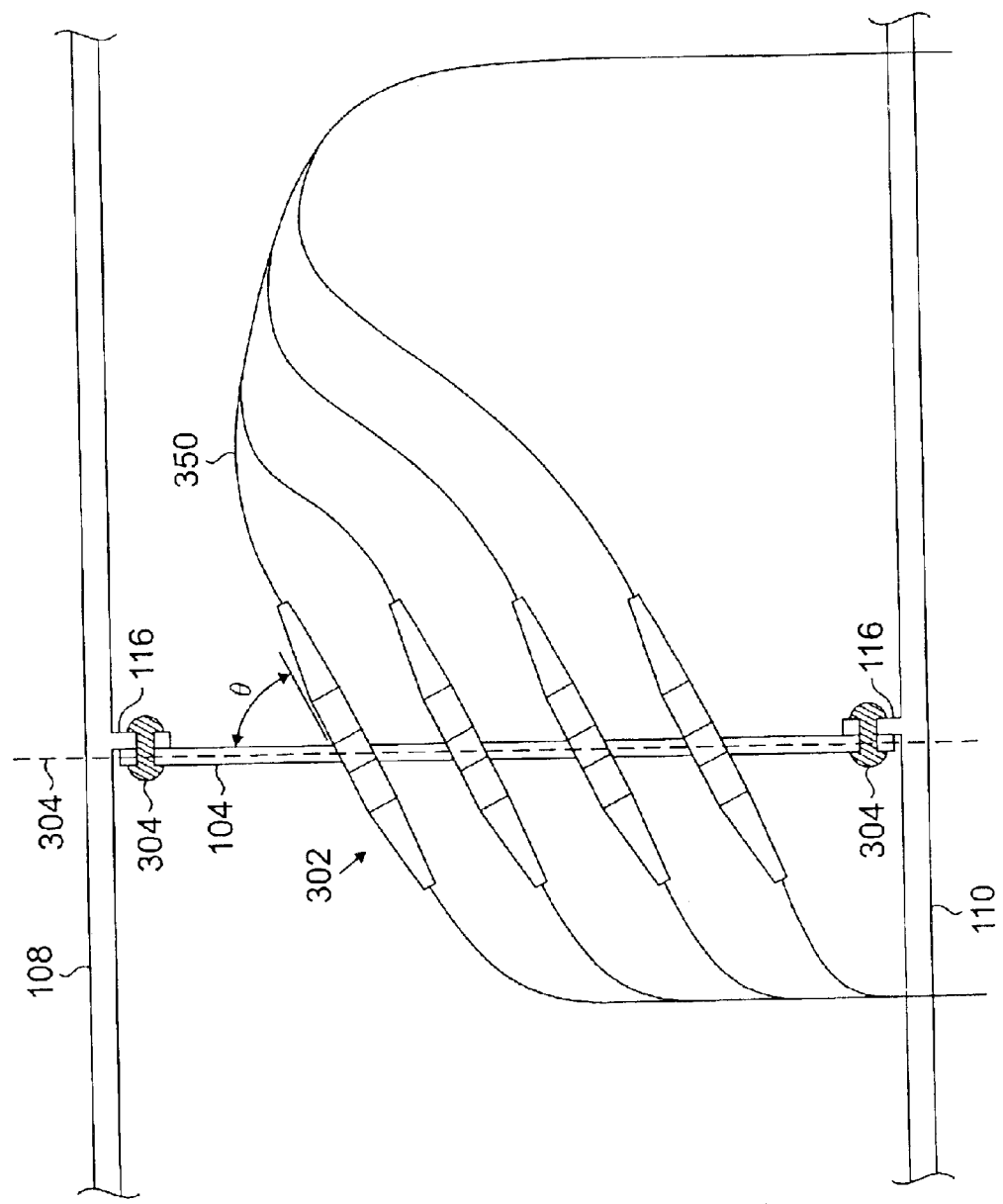
FIG. 3 is a partial cross-sectional view of the optical interconnection device of FIG. 1 having angularly mounted optical fiber connectors.

FIG. 3 is a partial cross-sectional view of the optical interconnection device 100 having angularly mounted optical connectors. Elements that are the same or similar to those shown in FIGS. 1 and 2 are designated with identical reference numerals and are described in detail above. The connector panel 104 is mounted to the flange 116 using fasteners 304. A plurality of optical connectors 302 (e.g., four are shown) are angularly mounted within the connector panel 104. In particular, the optical connectors 302 form an angle θ with respect to a plane 306 of the connector panel 104, where θ is less than 90 degrees. Notably, as used herein by example, the angle θ refers to the acute angle the optical connectors 302 make with respect to the plane 306 of the connector panel 104. In one embodiment, the angle θ is between 15 and 45 degrees.

The optical connectors 302 connect portions of optical fiber 350 in a well known manner. Since the optical connectors 302 are angularly mounted within the connector panel 104, the optical connectors 302 exhibit less depth than that exhibited by perpendicularly mounted optical connectors. This reduces the risk that a technician manipulating one of the optical connectors 302 will damage an optical fiber. In addition, the angularly mounted optical connectors 302 increase safety by reducing the risk of direct laser contact with the eyes of a technician installing the optical connectors 302.

Figure 4:
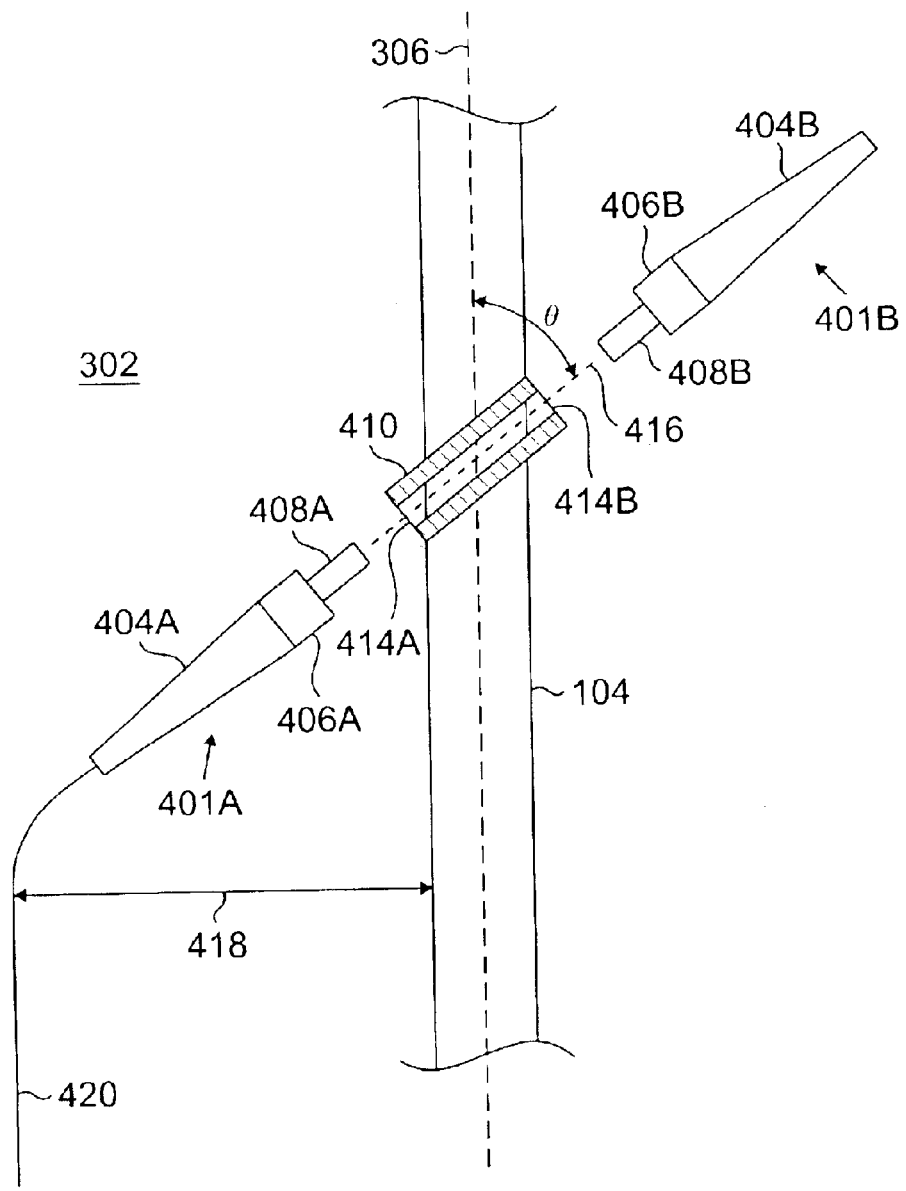
FIG. 4 is a partial cross-sectional and exploded view of a single one of the optical connectors of FIG. 3 mounted within a connector panel.

FIG. 4 is a partial cross-sectional and exploded view depicting an exemplary embodiment of a single one of the optical connectors 302 mounted within the connector panel 104. The optical connector 302 comprises a receptacle 410 disposed between two connector members 401A and 401B (collectively referred to as connector members 401). The receptacle 410 comprises a first port 414A and a second port 414B. The first and second ports 414A and 414B together form a bore 414 through the center of the receptacle 410. The connector panel 104 includes an aperture 107 (shown in FIGS. 1 and 2) adapted to receive the receptacle 410. In one embodiment, the receptacle 410 is molded onto the connector panel 104. When the receptacle 410 is supported in the connector panel 104, a longitudinal axis 416 of the receptacle 410 is disposed at a predefined angle θ with respect to the plane 306 of the panel 104, where the predefined angle is less than 90 degrees.

The present invention can be used with various types of optical connectors, such as ST, SC, FC, LC, and like type optical connectors known in the art. In the present embodiment, the connector members 401A and 401B respectively comprise bend-limiting strain-relief boots 404A and 404B, connector housings 406A and 406B, and ferrules 408A and 408B. The optical connector 302 may comprise additional components not shown, but understood by those skilled in the art, including washers, retainer clips, springs, sleeves, and various inserts. Briefly stated, an optical fiber (not shown) is disposed in a bore within the bend-limiting strain-relief boot 404A and the connector housing 406A. The ferrule 408A is also disposed within the connector housing 406A and mates with the optical fiber. An optical fiber is similarly situated within connector member 401B.

The bore 414 is adapted to receive ferrules 408A and 408B at the first port 414A and the second port 414B, respectively. As such, ferrules 308A and 308B are axially aligned, extend into ports 414A and 414B, respectively, and mate with each other inside the bore 414 of the receptacle 410. The ferrules 408A and 408B mate with each other such that the optical connector 302 interconnects a pair of optical fibers. When the connector members 401A and 401B are connected to the receptacle 410, the longitudinal axis of the optical connector 302 is disposed at the predefined angle θ with respect to the plane 306 of the panel 104.

As such, a total depth of the connector member 401A and an attached optical fiber 420 with respect to the connector panel 104, designated by reference numeral 418, is less than a total depth of an optical connector and an attached optical fiber that is perpendicularly mounted within the optical connector panel 104 (i.e., where the angle θ is 90 degrees). This also applies to the actual depth of the connector member 401A (i.e., the length between the connector panel 104 and the end of the bend-limiting strain-relief boot 404A). The difference between the total depth, as used herein, and the actual depth, is the radius of curvature of the optical fiber 420. As is apparent from FIG. 4, the smaller the angle θ, the smaller the total depth of the optical connector 302 and attached optical fiber 420. That is, for a given optical connector, the total depth is directly proportional to the acute angle the optical connector makes with the plane of the connector panel). Thus, the risk that a technician manipulating the connector member 401A will damage the optical fiber 420 is reduced.

While the foregoing is directed to the preferred embodiment of the present invention, other and further embodiments of the invention may be devised without departing from the basic scope thereof, and the scope thereof is determined by the claims that follow.

What is claimed is:

1. An optical interconnection device, comprising:
a housing having a top wall, a bottom wall, a first side wall extending between the top wall and the bottom wall, and a second side wall extending between the top wall and the bottom wall opposite the first side wall;
a panel mounted within the housing extending between the top and bottom walls and the first and second side walls, the panel having a first side a second side and a plurality of apertures formed therein;
a plurality of receptacles respectively supported within the plurality of apertures, each of the plurality of receptacles adapted to communicate with an optical connector and being disposed at an angle with respect to a plane, of the panel, the angle being less than 90 degrees;
first and second spools respectively mounted to the first and second side walls; and
first and second optical fiber troughs mounted to the bottom wall and extending between the first and second side walls on the first and second sides of the panel, respectively, each of the first and second optical fiber troughs including a plurality of retainer rings.

2. The optical interconnection device of claim 1, wherein each of the first and second spools includes a panel portion, a cylindrical portion extending from the panel portion, and a plurality of retention members extending from the panel portion.

3. The optical interconnection device of claim 2, wherein the first side wall includes first opposing grooves for supporting the first spool and the second side wall includes second opposing grooves for supporting the second spool.

4. The optical interconnection device of claim 1, wherein the angle is between 15 and 45 degrees.

5. The optical interconnection device of claim 1, further comprising:
a plurality of optical connectors, each of the plurality of optical connectors communicating with a receptacle of the plurality of receptacles.

6. The optical interconnection device of claim 5, wherein each of the plurality of receptacles includes a bore disposed therein, and wherein each of the plurality of optical connectors includes a ferrule for communicating with the bore of a respective receptacle.

7. The optical interconnection device of claim 6, wherein each of the plurality of optical connectors includes a connector housing and a bend-limiting strain-relief boot coupled to the connector housing, and wherein a longitudinal axis of the connector housing and the bend limiting strain-relief boot is disposed at an angle with respect to the plane of the panel substantially equal to the angle of the plurality of receptacles.

* * * * *